Figure 1:
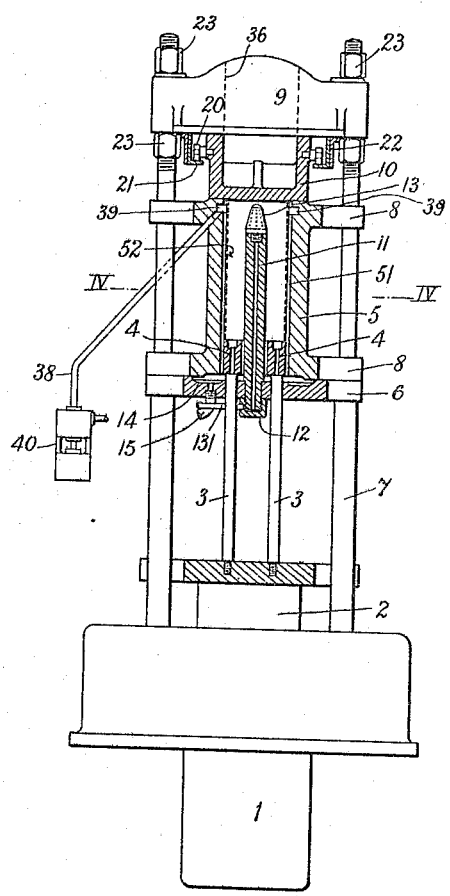

J. W. HINCHLEY.
PROCESS FOR EXPRESSING LIQUID FROM PEAT.
APPLICATION FILED SEPT. 25, 1916.

1,222,210.

Patented Apr. 10, 1917.
2 SHEETS—SHEET 1.

Inventor
John William Hinchley

J. W. HINCHLEY.
PROCESS FOR EXPRESSING LIQUID FROM PEAT.
APPLICATION FILED SEPT. 25, 1916.
1,222,210.
Patented Apr. 10, 1917.
2 SHEETS—SHEET 2.
Fig. 3.
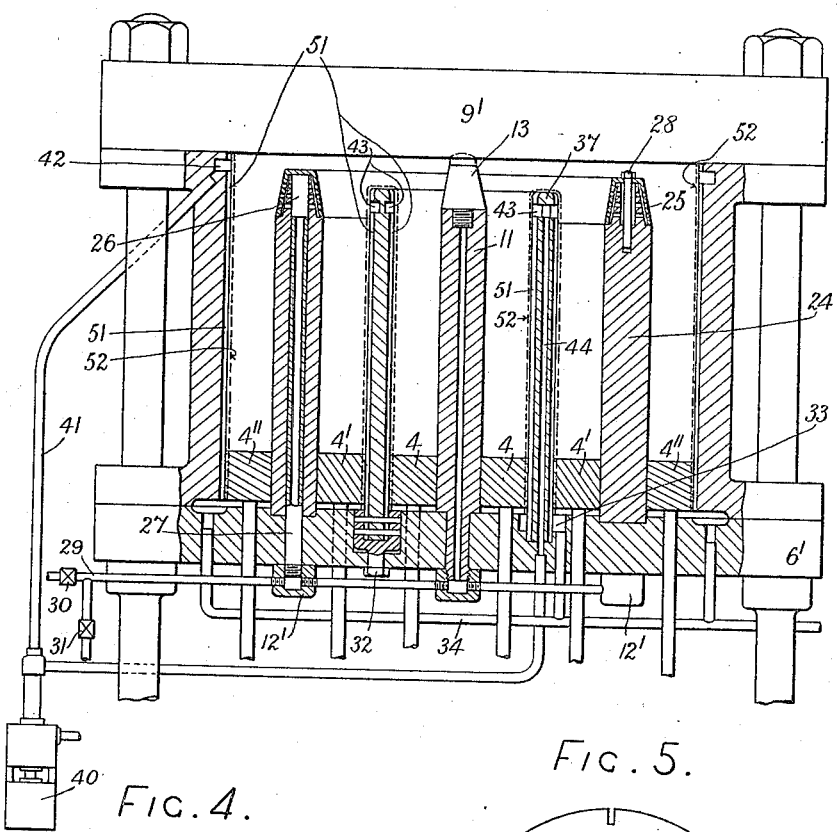
Fig. 4.
Fig. 5.
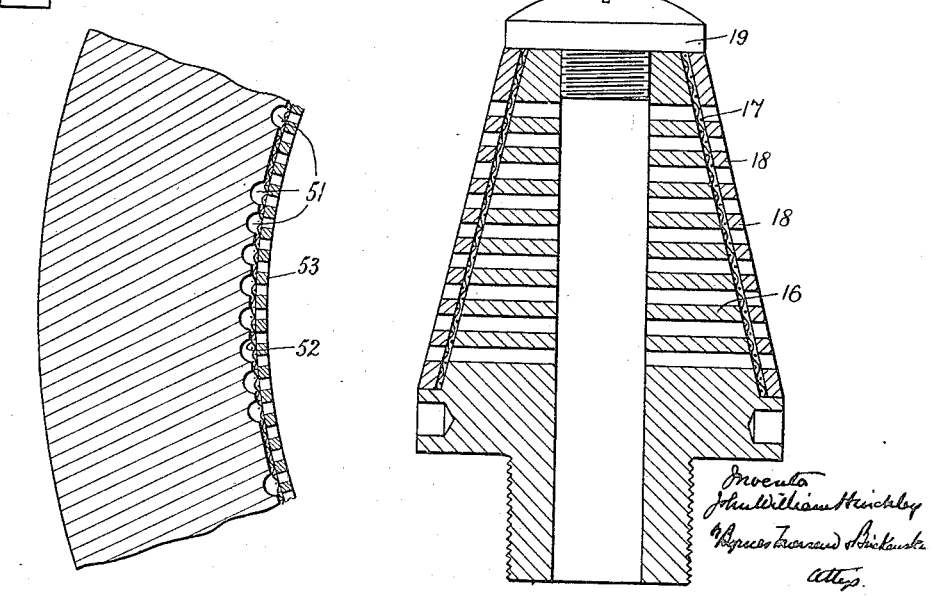

UNITED STATES PATENT OFFICE.

JOHN WILLIAM HINCHLEY, OF LONDON, ENGLAND.

PROCESS FOR EXPRESSING LIQUID FROM PEAT.

1,222,210. Specification of Letters Patent. Patented Apr. 10, 1917.

Application filed September 25, 1916. Serial No. 122,128.

*To all whom it may concern:*

Be it known that I, JOHN WILLIAM HINCHLEY, subject of the King of the United Kingdom of Great Britain and Ireland, residing at 55 Redcliffe road, London, S. W., England, have invented certain new and useful Improvements in and Relating to Processes for Expressing Liquid from Peat, of which the following is a specification.

The present invention relates to processes for expressing liquids from peat, and the object of the invention is to obtain a compressed product which is as dense and liquid-free as possible but which can be produced at a comparatively low cost.

The peats started with are not highly rotted peats which are nearly free from fiber, but are peats containing in their solid constituents a substantial percentage of fiber, a minimum of about 30 per cent. of fiber which does not pass through a ⅛ inch mesh sieve being preferred.

Some natural peats will be found to conform with this condition, but the materials started with may be mixtures consisting of both lower layers of bog (containing below said minimum of fiber) and upper layers of bog (containing above said minimum).

The invention particularly relates to processes wherein the peat is subjected to mechanical pressure to express the liquid contained therein, and, while still in the press, is traversed by a current of gaseous fluid, such as steam or hot or cold compressed air.

In known processes of this kind, the presses employed have been unsuitable for high pressures and the peat either has been traversed by said gaseous fluid during the whole of the pressing operation, or, before the entry of the fluid, has been subjected to a preliminary pressure only sufficient to fill up the interstices in the peat, and after the passage of the fluid has been finally dried or highly pressed in separate apparatus.

According to the present invention, the peat is first subjected at the ordinary temperature to a high degree of substantially evenly distributed pressure, such as by hydraulic means, before the current of gaseous fluid is admitted; and then the current of gaseous fluid is admitted and then the peat is subjected after the supply of gaseous fluid has been cut off, or, during said supply and after the same, to a further high degree of pressure to express from the peat while still in the press as much as possible of the remaining liquid, the whole of the operations thus involving only one handling of the material. Before said gaseous fluid is admitted to the compressed mass, the pressure on the latter may be reduced sufficiently to allow easy penetration of the fluid into the mass. The operation may be continuous, that is, the pressure may be continuously increased from beginning to end.

To secure high economy in cost the peat should be in its thoroughly wet condition before the application of the first pressure; consequently no preliminary heating or like treatment should be given.

During the period in which the gaseous fluid or fluids are passed through the material, the latter may either remain under the pressure formerly applied or be released from such pressure; or the pressure may be diminished or increased simultaneously with the passage of the gaseous fluid. The method of working is determined by the nature and properties of the material started with.

When steam or hot compressed air or both are employed for the second stage of the new process, the liquid remaining in the mass is considerably reduced in viscosity owing to the rise of temperature; in this way also mucilaginous matter in the mass may be destroyed. The quantity of liquid expressed by the final pressure is therefore greater than the quantity which would be expressed without the said reduction in viscosity and the said destruction. Moreover the heat serves as a further drying agent after the compressed mass has been removed from the press.

In order to prevent the strainers from becoming choked, liquid (for example, the expressed liquid after it has been filtered) may be pumped down the courses or grooves down which the expressed liquid flows. For this purpose a groove may be formed around the top of the cylinder wall, a suitable inlet for the groove being provided, through which a pump may supply the liquid.

The following is an example of a method of carrying out the new process, but the invention is not limited to this example.

A suitable hydraulic press, such as that hereinafter described, is charged either with a peat sludge, *i. e.* a material which contains enough water to flow readily, or with a peat containing less water, for example, an ordinary peat containing 4½ parts water and 1 part peat. This is evenly distributed in the press, and the more even the distribution, the more uniform will be the composition of the final product and the less moisture will it contain.

This peat is preferably not subjected to any preliminary heating or other treatment such as heretofore employed in order to remove a portion of the water before the peat is subjected to pressure. As the first pressing operation is conducted cold the presence of the water content referred to above is no disadvantage, but the saving in cost due to the elimination of the said preliminary treatment is a consideration.

A peat as described is charged into the hydraulic press, and the first or cold pressing is carried out until so much liquid is expressed that the mass contained in the press consists of about 2 parts water and 1 part peat. With filtering surfaces about 3 inches apart this operation may occupy somewhat less than 25 minutes the pressure on the mass rising during that period to about 1000 lbs. per sq. inch.

After the first pressing, the pressure on the mass is allowed to drop to, or below, the pressure at which the current of gaseous fluid is to be admitted. Allowing a reduction to 200 lbs. per sq. in., steam at this pressure is thereupon passed through the mass while the latter is still in the hydraulic press. This steaming operation lasts about 15 minutes, whereupon the steam is cut off and the second or final pressing operation is effected hydraulically. The pressure applied is then 1100 lbs. to 1500 lbs. per sq. inch. The final mass which will be a cake of about ⅕ of the original volume of the material will contain less than 50 per cent. of water, and with some peat less than 40 per cent. To prevent the strainers from becoming choked water may be pumped down the courses at the back of the same.

On being discharged from the press the cake is hot, and, if immediately reduced to powder and dropped through the air, loses still more moisture.

The cakes may however be used at once as fuel or carbonized for the production of peat by-products.

An alternative method of working and one which economizes time is to admit hot gaseous fluid while the pressure is being applied. In this case, after charging the press a large proportion of the water is pressed out cold and then steam or other hot gaseous fluid is admitted, the pressure rising all the time. At any convenient pressure the gaseous fluid is cut off and the pressing operation continued and maintained finally for some minutes at say 1200 to 1500 pounds per square inch. By working in this manner the operation becomes continuous and can be carried through in less than 30 minutes, the final cake containing less than 50 per cent. of water.

Apparatus for carrying out the process according to the present invention is preferably of the type wherein the peat is compressed by means of a piston in a chamber which is entirely closed except for the apertures on the strainers, and in which means are provided for passing gaseous fluids through the mass in the compression chamber in a direction substantially at right angles to the movement of said piston. This piston is actuated in known manner by mechanical means suitable for giving very high pressure, for example, by hydraulic means. The means for admitting said gaseous fluid may comprise or be independent of said strainers. The latter either wholly or, by preference, in part may serve as such means, and may serve either to admit or to discharge said gaseous fluid, or to do both. The strainers are preferably protected by perforated liners which are placed close up against them to protect them from the highly compressed peat, and which provide bearing surfaces for the pistons.

The press preferably employed is one in which the flow through the filtering surfaces is at right angles to the direction of movement of the piston. Any press of this type may be employed and the press described in the British Patent Specification No. 24,819 of 1911 is referred to as an example of this type.

Two examples of apparatus for carrying out the new process are illustrated in the accompanying drawings, wherein—

Figure 2:
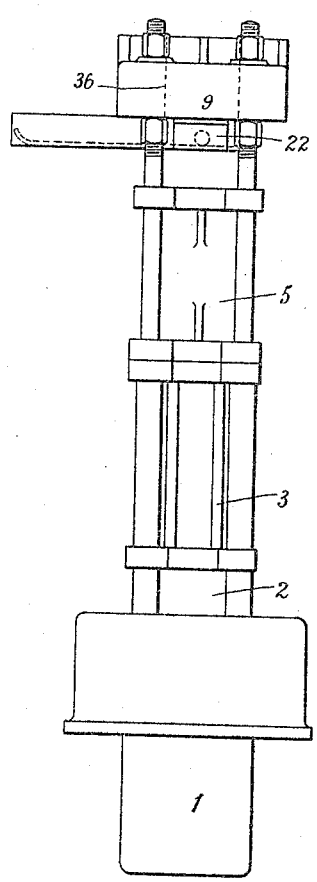

Figure 1 is a vertical section of the first form of apparatus,

Fig. 2 an end elevation of the same,

Fig. 3 a vertical section of the second form of apparatus, and

Fig. 4 a horizontal section of a part of the outer cylinder wall on the line IV—IV in Fig. 1, and shows in addition thereto a liner 53 protecting a strainer 52 adjacent to the inner surface of the wall.

Fig. 5 is a detail view showing in vertical section the central steaming nozzle.

Referring to Figs. 1 and 2, which show the simpler form of press, 1 is the hydraulic cylinder, 2 the ram, 3, 3 the various piston rods on the latter, and 4, 4 is an annular piston carried by the said rods. The cylinder 5 of the press is supported by plate 6 carried by the pillars 7, which latter have extensions passing through the plate 6, lugs 8 on the cylinder and head 9. The inner walls of the cylinder have grooves 51 of a section as shown in Fig. 4 and this grooved surface is provided with a wire strainer 52 of wire gauze of 30 or more meshes to the inch, which wire may be of iron, nickel or bronze. Fig. 4 shows in addition a modification in which the strainer 52 is protected by a strong perforated liner 53. This liner which also provides a bearing surface for the piston may for instance be a steel perforated plate about ⅛ inch thick and provided with holes ⅛ inch in diameter.

Between the cylinder and the head may be provided an intermediate member or cover 10 which is clamped firmly down on the cylinder when the press is in operation. The means for removing this cover will be more particularly described hereinafter.

Mounted centrally on the cylinder 5 is the steaming tube 11, which is provided below with a screwed shank whereby it is clamped to the plate 6 by means of the screwed cap 12.

The steaming tube carries at its upper end the cone 13 which, as will be explained hereinafter, serves both as strainer and as a nozzle for injecting steam. This strainer may however be cylindrical instead of conical. In the cap 12 is provided a hole whereinto is screwed a pipe 131 which at one time serves to discharge liquid entering the cone 13 and at another time to admit steam to the latter.

In the upper surface of the plate 6 and below the grooves 51 in the cylinder wall is provided an annular channel 14 drained by a pipe 15. In this way the liquid which is expressed outwardly from the peat and passes through the strainer into the grooves 51 is discharged through the pipe 15. The strainers are preferably kept from becoming choked by the pump 40 which pumps water through pipe 38 and along the groove 39 to the space at the back of the strainer and so washes away obstructive matter.

The cone 13 which is screwed into the end of the tube 11 is shown in detail in Fig. 5. As will be clear from this figure, the cone consists of a nozzle 16 covered by a wire strainer 17 which is held in place by the perforated cap 18. The latter is clamped down by the screw 19.

The cover 10 carries rollers 20, which are capable of running on the rails 21 (Figs. 1 and 2) the latter being held by angle brackets 22 fastened to the head 9. When the head is raised slightly by manipulating the nuts 23, it is then possible (as is clear from Fig. 2) readily to transfer the cover to a position clear of the cylinder. A large hole 36 in the head of the press may be used for charging the cylinder.

The above described apparatus is operated in the following manner:—

The cover 10 being rolled aside, the peat sludge is charged into the cylinder, which, after the return of the cover is closed securely by means of nuts 23.

The piston is now advanced hydraulically until a suitable amount of cold liquid has been expressed from the peat. During this operation the expressed liquid passes partly through the outer strainers 52 and partly through the strainer 17 (Fig. 5) in the cone 13. Drainage is effected through the pipes 15 and 131.

After the first pressing the hydraulic supply is cut off for a time and the pressure on the mass is allowed to fall to about 200 lbs., whereupon steam at this pressure is admitted by the pipe 131. This steam issues from the cone 13, heats the peat mass, and if not condensed after passing through the mass passes through the cylinder strainer 52 and with the water of condensation issues from the pipe 15. When using steam it is economical to condense it all, and to stop the operation when live steam escapes.

After steaming, the piston 4 is again advanced until the desired degree of compression has been obtained. The cover 10 being then removed, the cake in the press is readily ejected by further advancing the hydraulic plunger.

Fig. 3 illustrates a large scale apparatus wherein, however, the steaming tube 11 is constructed precisely as before. This apparatus contains three concentric pistons 4, 4', 4", with corresponding annular compression chambers. Grooves 51 covered by strainers 52 are provided in the inner and outer cylinder walls, and between these walls is provided an annular steaming ring 24. The latter has an annular perforated cap 25 for holding the strainers as in the case of the cone 13. This cap may have cylindrical sides instead of the sloping sides illustrated. The steaming ring is provided with an annular duct 26 whereinto steam is admitted by pipes 27 cast integral with the ring. The cap 25 is held by screws 28 to the bottom of said duct. Caps 12' on the pipes 27 serve the purpose of cap 12 in Fig. 1 and the piping 29 that of pipe 131 in that figure, the cock 31 being employed to discharge liquid from the peat, and the cock 30 to admit the steam.

The strainers are preferably in all cases protected by coarsely perforated liners 53 as shown in Fig. 4 against which the pistons slide.

The inner cylinder 37 is suitably held, as by Y-bolts 32, and is drained by channels 33 connected to an exhaust service 34 for draining in the same way as pipe 15 in Fig. 1.

In this case also a pump 40, pipe 41, groove 42 are provided to prevent the outermost strainer from becoming choked and similarly the strainers on the inner cylinder are provided with the grooves 43, 43 and the passage 44 to permit water to be pumped to the backs of said strainers.

It will be observed that this press differs from that shown in the cited specification No. 24819 of 1911, among other things in that the inner cylindrical straining cylinder 37 is not carried to the head 9' but is a substantial distance therefrom, the object being to equalize the pressure while the mass is in flowing condition.

The steaming ring 24 is also preferably carried to a point some distance from the head for a similar reason.

Though a plain head 9' is shown in Fig. 3 it is obvious that a removable cover, such as 10 in Fig. 1, may alternatively be employed.

The apparatus herein referred to is claimed in my copending application, Serial No. 122,127, filed herewith.

I claim:—

1. Process for expressing liquid from peat comprising subjecting the peat at the ordinary temperature to evenly distributed pressure, admitting after the application of said pressure a current of hot gaseous fluid and cutting off the same and thereafter subjecting the peat to a higher degree of pressure than that existing during the admission of the fluid.

2. Process for expressing liquid from peat comprising subjecting the peat at the ordinary temperature to evenly distributed pressure continuously increasing up to a final limit, admitting after the application of said pressure a current of hot gaseous fluid and cutting off the same before the pressure has reached its final limit.

3. Process for expressing liquid from peat comprising subjecting the peat at the ordinary temperature to evenly distributed pressure, admitting after the application of said pressure a current of hot gaseous fluid and cutting off the same and thereafter subjecting the peat to a higher degree of pressure than that existing during the admission of the fluid and forcing the liquid through strainers and forcing liquid down the backs of the strainers to prevent the latter from being choked up.

In testimony whereof, I affix my signature in the presence of two witnesses.

JOHN WILLIAM HINCHLEY.

Witnesses:
HULU M. PEET,
WILLIAM R. SHARP.

Copies of this patent may be obtained for five cents each, by addressing the "Commissioner of Patents, Washington, D. C."